Patented Apr. 14, 1936

2,037,042

UNITED STATES PATENT OFFICE 2,037,042

FOOD MATERIAL AND PROCESS OF MAKING IT

Rose G. Perewe, Brooklyn, N. Y.

No Drawing. Application June 4, 1932,
Serial No. 615,479

7 Claims. (Cl. 99—85)

This invention relates to food material and process of making it, and is herein illustrated as embodied in the making of noodle-like material from starchy substances which are substantially gluten-free.

It has hitherto been supposed that such food products as macaroni and noodles could be made only from flours unusually rich in gluten, and so-called macaroni wheats have been developed to provide the desired types of flour. Wheats and other starchy grains which lacked the necessary gluten were not usable for macaroni and noodle making because they yielded short and crumbly mixtures instead of suitable doughs.

According to the present invention no gluten is needed, its function being supplied by the properties of added egg yolk, substantially free from egg white, although the egg yolk is primarily a fatty and not a gluten material. In fact the egg yolk, being an animal product, brings new properties into a noodle without introducing excessive amounts of albumen. It is found that a satisfactory noodle-like product is obtainable only if egg white is substantially absent, because in the presence of material amounts of egg white the mixed mass is crumbly instead of dough-like.

Other features and advantages will hereinafter appear.

Potato starch was made at home or in the laboratory by grating peeled and washed potatoes so that the grated material fell into a container having perforations in its bottom about $\frac{1}{16}$ inch across. The natural moisture of the potatoes carried much of the potato starch into a lower receptacle, and more starch was carried through by working and kneading mass retained on the perforated bottom, leaving a residue containing some starch and useful for food either mixed fresh with suitable materials or dried and then used. For example one quart of the residue was mixed with the whites of three eggs, two tablespoonfuls of wheat flour, and 1¼ heaping teaspoonful of salt, and pepper, and cooked as a pancake or pudding.

The starch which had come through the perforated bottom was allowed to settle and the water decanted or poured off, mixed with more water, allowed to settle, the water decanted, until a practically pure starch was obtained.

The starch was dried by being spread out in a thin layer, and then crushed to a powder. The powdered starch substantially free from gluten was then mixed with about an equal amount of fresh egg yolk, substantially free from egg white, the two being stirred together until a coherent, plastic, dough-like mass was obtained. The dough could be readily rolled out or molded into any desired shape. The best results were obtained with potato starch when only practically pure fresh egg yolk was mixed with rather less potato starch, the proportions being about 47½% starch and 52½% egg yolk, though sometimes it has been found possible to use as much potato starch as egg yolk. Apparently the egg yolk should contain its natural moisture, because dried egg yolk has been found usually unsatisfactory.

The dough may be sheeted out, initially dried a few minutes, cut to slices and finally dried, the final drying in a house atmosphere taking one or two days, and the sheets lose about a quarter of their weight. The dried product is found to keep perfectly without spoiling, and to be capable of use as ordinary noodles are used. Moreover the material has other uses, partly owing to the high vitamin content of the contained egg yolk.

It has also been found possible to make similar noodle-like material with other starches such as corn starch, arrowroot starch, cassava starch, and tapioca starch flour. When these other (finer granuled under the microscope) starches are used it is found that part of the egg yolk may be replaced with other moist or liquid substances,— as much as five to eight percent of water has sometimes replaced an equivalent amount of egg yolk, or more starch may be used and yet obtain a satisfactory product.

It has been found that the best results are obtained with substantially pure starches, and that large admixtures of gluten-containing flour, such as wheat flour are relatively unsatisfactory.

The dried noodle-like material baked at about 350° F. for a few minutes until a golden brown forms an agreeable and valuable breakfast food. If then ground to a powder with flavoring material such as cocoa, sugar or essence of vanilla, it yields a palatable and nutritious beverage.

The new material behaves somewhat like noodles in cooking but absorbs less water and consequently is a more concentrated starch food. Most of the new material floats during cooking thus making it unnecessary to stir it. It no longer absorbs large amounts of water dissolving like starch to form a starchy paste, but retains its form even when stirred during long cooking, and the surrounding water remains watery when cold instead of solidifying into a jelly as it would have done had a corresponding amount of starch been present in the absence of the egg yolk, or would have done if egg white were also present.

Unlike noodles hitherto made, the new material is found not to ferment to deteriorate in flavor when kept in soups overnight or longer.

Having thus described certain embodiments of the invention, what is claimed is:

1. The process of making a food product in the form of a noodle-like mass which consists in mixing starch substantially free from gluten with egg yolk substantially free from egg white and not much more than its natural moisture and in sufficient quantity to form a noodle-like mass upon drying, and drying the mixed materials.

2. The process of making a food product in the form of a noodle-like mass which consists in mixing starch substantially free from gluten with about an equal weight of egg yolk substantially free from egg white and not much more than its natural moisture, and drying the mixed materials.

3. The process of making a food product in the form of a noodle-like mass which consists in mixing a starch substantially free from gluten having granules finer than potato starch with about an equal weight of egg yolk substantially free from egg white and with not more than about five percent of other moisture, and drying the mixed materials.

4. A food product substantially free from gluten and consisting largely of starch and substantially dependent upon the presence of egg yolk to give it the property of behaving like noodles.

5. A food product substantially free from gluten and consisting largely of potato starch and substantially dependent upon the presence of egg yolk to give it the property of behaving like noodles.

6. A food product substantially free from gluten and consisting largely of corn starch and substantially dependent upon the presence of egg yolk to give it the property of behaving like noodles.

7. A baked food product substantially free from gluten and consisting largely of starch and substantially dependent upon the presence of egg yolk to give it the property of behaving like noodles.

ROSE G. PEREWE.